Aug. 8, 1950

C. P. PINARDI 2,518,175

STEERING MECHANISM

Filed July 24, 1946

CHARLES P. PINARDI
INVENTOR.

BY
C.C. McRae
R.D. Harris
J.R. Faulkner
T.H. Oster
ATTORNEYS.

Aug. 8, 1950     C. P. PINARDI     2,518,175
STEERING MECHANISM

Filed July 24, 1946     2 Sheets-Sheet 2

CHARLES P. PINARDI
*INVENTOR.*

BY
E. C. McRae
R. D. Harris
J. R. Faulkner
T. H. Oster

ATTORNEYS.

Patented Aug. 8, 1950

2,518,175

UNITED STATES PATENT OFFICE 2,518,175

STEERING MECHANISM

Charles P. Pinardi, Dearborn, Mich., assignor to Ford Motor Company, Dearborn, Mich., a corporation of Delaware Application July 24, 1946, Serial No. 685,849

7 Claims. (Cl. 74—552)

This invention relates generally to steering mechanisms and has particular reference to an adjustable steering wheel for motor vehicles.

In automotive vehicles, it is customary to rigidly mount the steering column at a fixed angle with the horizontal and to journal the steering post within the column. The steering wheel is rigidly mounted upon the upper end of the steering post at right angles to the axis of the post, and thus rotates in a plane arranged at a fixed angle with the vertical. The angle between the steering wheel and the vertical varies with the vehicle design from a nearly horizontal position in trucks and the like to a nearly vertical position in racing and sport cars. An intermediate position is chosen for conventional passenger cars, although in recent years the trend toward lower bodies has resulted in arranging the steering column at a smaller angle with the horizontal with the result that the steering wheel has been more nearly vertical. Thus, the position is determined not only by the requirements of comfort of the driver, but also by the overall car design. Although the selected position is likely to be satisfactory with a majority of owners, nevertheless there are many individuals who would prefer some change in the angular postion of the steering wheel. For example, personal physical characteristics such as weight, height, etc., may render the conventional position uncomfortable. In addition, other drivers may, because of driving habits or personal preferences, prefer a different position of the steering wheel.

The present invention overcomes the above-mentioned and other disadvantages of the conventional type of steering wheel and steering column construction by providing a steering wheel which may be adjusted to suit the personal requirements of the individual driver. With this arrangement, the angle between the plane of the steering wheel and the vertical can be varied as desired, allowing the steering wheel to be adjusted in both directions from a plane perpendicular to the steering post. This is accomplished by providing a bearing ring which may be angularly adjusted and locked in any desired position, in combination with a steering wheel having a bearing guide engageable with the bearing ring so that the steering wheel will rotate in the plane of the bearing ring. In addition, a universal joint connection is provided between the steering post and the steering wheel to permit rotation of the wheel in a plane not normal to the steering post.

Another object of the invention is to provide an adjustable steering wheel containing a minimum of parts and which can be pre-assembled as a unit and quickly attached by a few simple operations to the steering column during final assembly of the vehicle. The mechanism can thus be economically manufactured and assembled.

Other objects and advantages are included in the present invention and will be more apparent as this description proceeds, particularly when considered in connection with the accompanying drawings, in which.

Figure 2:
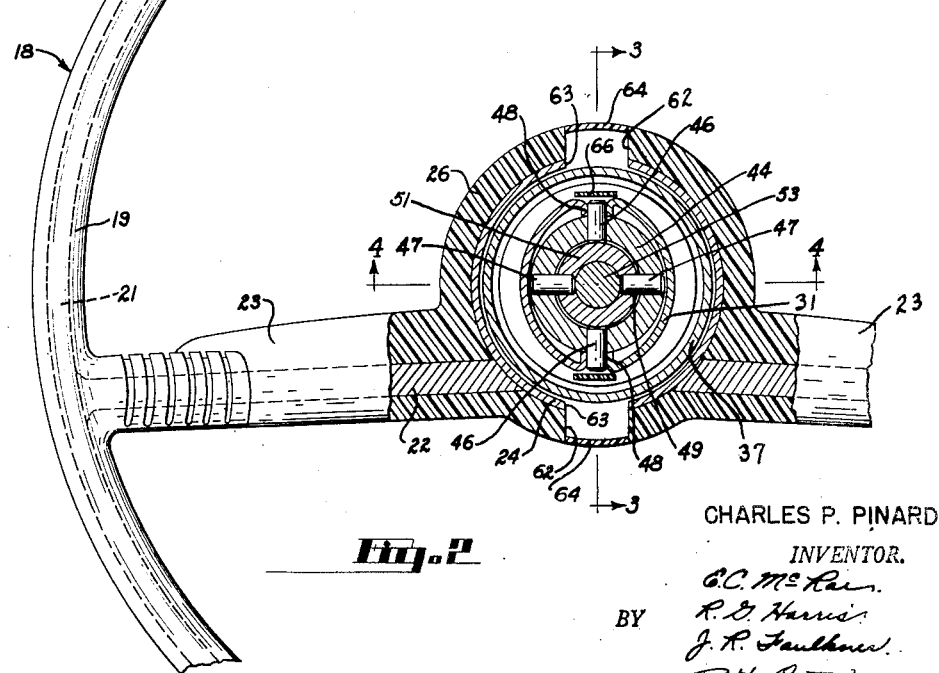
Figure 2 is a fragmentary plan view of the steering wheel, shown partly in cross section as taken on the plane indicated by the line 2—2 of Figure 4.
Figure 3:
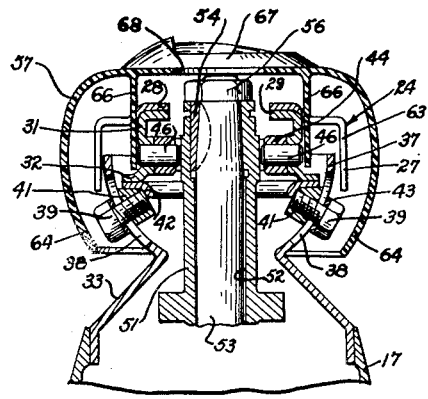
Figure 4:
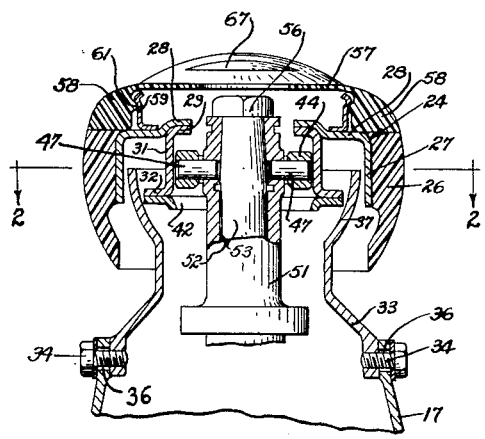

Figures 3 and 4 are cross sectional views taken substantially on the planes indicated by the lines 3—3 and 4—4 of Figure 2.

Figure 5:
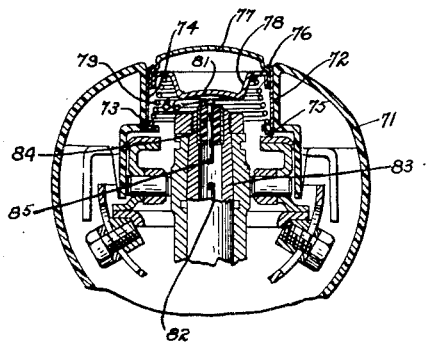

Figure 5 is a cross sectional view through a modification.

Figure 1:
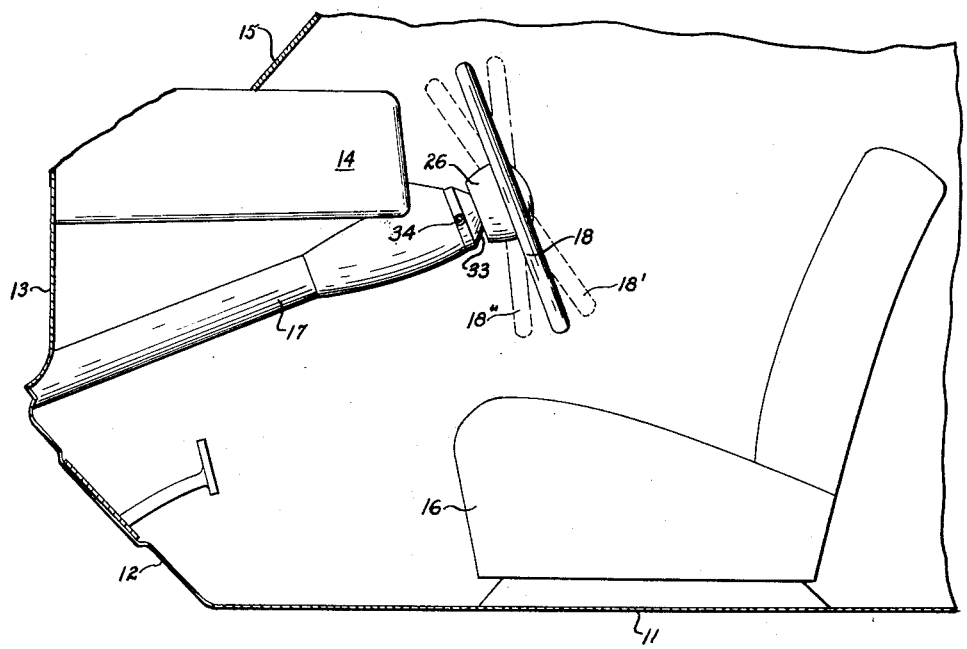
Figure 1 is a semi-diagrammatic side elevational view of a portion of the interior of a motor vehicle.

With particular reference now to the drawings, there is shown in Figure 1 a portion of a motor vehicle body including floor 11, toe board 12, dashboard 13, instrument panel 14 and windshield 15. A conventional front seat 16 is mounted upon the floor 11. A steering column 17 extends between the dashboard 13 and the instrument panel 14, being rigidly mounted at a predetermined angle with the horizontal. The steering wheel 18, mounted upon a steering post contained within the steering column, as will be described more in detail in connection with the other views of the drawing, is shown in full lines in its normal position at right angles to the axis of the steering column, and is adapted to be angularly adjusted between the postion 18' shown in dotted lines and the position 18'' shown in dot-dash lines. It will be noted that there is a considerable difference in the clearance provided between the steering wheel and the seat 16 in the various adjusted positions of the wheel. In addition to providing greater driving comfort, greater visibility is provided for the driver in the position 18'.

Referring now to Figures 2, 3 and 4, the mechanism for accomplishing the above-mentioned adjustment will be described. The steering wheel 18 comprises a rim 19 formed of plastic molded upon a metal core 21, the latter being suitably welded or soldered to the metal cores 22 of the plastic covered spokes 23. The inner ends of the spoke cores 22 are secured to the hub 24 of the steering wheel, which may be formed of a diecasting. The exterior of the hub 24 is covered by a layer of plastic 26 which is suitably molded thereon.

As best seen in Figure 4, the hub 24 has an annular axially extending flange 27 supporting the plastic layer 26, and radially inwardly extending flange 28, the inner portion of which is spot welded to the upper flange 29 of a bearing guide member 31, the opposite end of which is formed with an outwardly extending radial flange 32.

Mounted upon the upper end of the steering column 17 is a steering column extension 33. Bolts 34 secure the extension to the steering column 17 and pass through axially extending slots 36 in the column to permit a slight amount of axial adjustment between the two members to compensate for manufacturing tolerances and to insure proper alignment between the working parts of the steering wheel mechanism. The lower portion of the steering column extension 33 is conical in shape, and merges into the upper portion 37 which is in the form of an open or hollow semi-spherical shell. As shown in Figure 3, the upper and lower portions of the semi-spherical shell 37 are formed with radial slots 38 through which pass adjusting bolts 39. The inner ends of the bolts 39 threadedly engage supporting blocks 41 of sufficient width to overlap the slots 38 and are provided with spherical outer surfaces for cooperation with the spherical inner surface of the shell 37. The two supporting blocks 41 carry a bearing ring 42 which is welded to the blocks to provide a unitary assembly. The upper surface of the bearing ring 42 is coated with a suitable bearing material such as graphite or bronze for engagement with the lower flange 32 of the bearing guide member 31.

From the foregoing it will be apparent that, except as limited by the length of the slots 38, the bearing ring 42 may be angularly adjusted to any desired angular position with respect to the axis of the steering column. This is accomplished by loosening the bolts 39 and rotating the assembly composed of the bearing ring 42 and the blocks 41 in the hollow spherical shell 37 to the desired position, after which the bolts 39 are tightened against lock washers 43 to lock the ring in the adjusted position.

Bearing ring 42 provides a bearing surface or race for the bearing guide member 31 which, through the hub 24, carries the steering wheel. Thus, with the bearing ring adjusted to any given position, the steering wheel is constrained to rotate in a plane parallel with the plane of the bearing ring.

To compensate for the angularity between the axis of the steering column and the axis of the steering wheel when the latter is adjusted to a position other than normal to the steering column, there is provided a universal joint mechanism consisting of a universal joint cross or ring 44 and two pairs of pins 46 and 47 arranged at right angles to each other. The inner ends of the pins 46 are carried in the ring 44 and the outer ends are journaled in bearing sleeves 48 formed in the guide member 31 at diametrically opposite points. The outer ends of the pins 47 are carried in the universal joint cross 44 and extend inwardly therefrom, being journaled in holes 49 formed in alignment with each other at diametrically opposite sides of the steering column post 51. The steering post 51 is provided with a bore 52, the upper end of which is tapered to engage the tapered upper end of the steering shaft 53. A key 54 is provided between the shaft and post, and a locking nut 56 is threaded on the end of the shaft 53 and engages the outer end of the post 51.

It will be seen that this construction provides a universal connection between the steering wheel and the steering shaft and permits rotation of the steering wheel in a plane inclined with respect to a plane perpendicular to the axis of the steering shaft.

A metal cup-shaped cover 57 covers the top of the steering wheel mechanism and is provided with a plurality of spaced ribs 58 arranged to seat upon the upper surface of the radial flange 28 of the steering wheel hub to locate the cover. Spring clips 59 are mounted upon the flange 28 of the hub and yieldingly engage projections 61 formed on the radially inner sides of the ribs 58 to secure the cover in place. It will be noted in Figure 4 that the outer surface of the cover 57 merges with the outer surface of the plastic layer 26 on the hub to form a smooth unbroken contour.

As best seen in Figures 2 and 3, aligned slots 62 and 63 are provided in the plastic layer 26 and the hub 24 at the upper and lower sides of the latter to provide access to the adjusting bolts 39 to permit the latter to be adjusted in the slots 38. These slots are normally covered by downwardly extending tongues 64 provided at the upper and lower sides of the cover 57. When it is desired to adjust the bearing ring 42 to change the angular position of the steering wheel, the cover 57 is removed to expose the slots 62 and 63. The slots 63 in the hub functions to provide clearance for the removal of the cover 57, since the lower edges of the tongues 64 extend radially inwardly a distance sufficient to interfere with the axial flange 27 of the hub, were the slots 63 not provided.

The cover 57 is also formed with a pair of downwardly depending flanges 66 extending through the slots 63 in the hub and retaining the pins 46 against outward displacement, thus simplifying the assembly of the steering wheel mechanism. A suitable decorative cap 67 is mounted in hole 68 provided in the top of the cover 57.

It will be noted that the entire steering wheel mechanism can be preassembled as a unit and readily attached to the steering column and the steering shaft during final assembly. The final assembly operation comprising bolting the steering column extension 33 to the steering column 17 by the bolts 34, and securing the steering post 51 to the steering shaft 53 by means of the key 54 and the locking nut 56. The cover 57 is then snapped in place over the clips 59 to complete the assembly.

The construction described above permits the steering wheel to be adjusted between the positions shown in 18′ and 18″ in Figure 1, according to the particular requirements or desires of the individual driver. Each driver can thus secure the benefit of a steering wheel angularly positioned to suit his individual needs. Furthermore, the adjustment between different positions is readily accomplished simply by removing the cover 67, loosening the adjusting bolts 39, and shifting the positions of the latter in the slots 38 until the bearing ring 42 and the steering wheel are in the desired plane. The universal joint mechanism between the steering post and the steering wheel is simple and smooth running, and permits rotation of the steering wheel in the plane determined by the particular adjustment of the bearing ring, compensating for the angularity between the axes of the steering wheel and the steering shaft.

The construction of the modification shown in Figure 5 is substantially the same as that shown in Figures 2 to 4 inclusive, except that provision has been made for mounting a horn button in the cover of the steering wheel. As shown, the cover 71 is formed with a shell 72 arranged concentrically with the axis of the steering wheel and provided adjacent its lower extremity with an inturned flange 73. Horn button retainer 74 is seated within the shell 72 and is provided with a plurality of tongues 75 at its lower edge which extend through openings in the flange 73 and prevent upward displacement of the retainer 74. The upper edge of the retainer 74 is rolled inwardly as at 76 to prevent upward displacement of the horn button 77. The horn button 77 carries an inner contact member 78, and the member 78 and button 77 are normally urged upwardly by the coil spring 79. The lower portion 81 of the contact member 78 is of spherical shape and concentric with the center 82 of the universal joint.

In this modification the steering shaft 83 is hollow and carries in its upper end an insulating sleeve 84 through which extends an electrical conductor 85 terminating at its upper end in a contact 86. Inasmuch as the lower portion 81 of the horn button contact member 78 is of spherical shape, concentric with the center of the universal joint, it will be apparent that an equal clearance is provided between the contact member 78 and the contact 86 regardless of the angular adjustment of the steering wheel with respect to the steering shaft. Uniform operation of the horn button is thus insured.

It will be understood that the invention is not to be limited to the exact construction shown and described, but that various changes and modifications may be made without departing from the spirit and scope of the invention, as defined in the appended claims.

What is claimed is:

1. Steering mechanism for a motor vehicle comprising, in combination, a steering column, an annular bearing member at the upper end of said steering column extending in its normal position in a plane at right angles to the axis of said steering column, means for angularly adjusting said bearing member with respect to its normal plane, a steering post within said steering column, a steering wheel connected to said steering post, and a member rotatable as a unit with said steering wheel and slidably engageable with said bearing member to determine the plane of rotation of said steering wheel.

2. Steering mechanism for a motor vehicle comprising, in combination, a steering column provided adjacent its upper end with a pair of slots formed on an arc of a circle whose center is on the axis of said steering column, a bearing plate angularly adjustable about the center of said circle, clamping means extending through said slot and arranged to lock said bearing plate in a plurality of adjusted positions, a steering post within said steering column, and a steering wheel mounted upon said steering post and having a portion engageable with said bearing plate to guide said steering wheel for rotation in a plane parallel to said bearing plate.

3. Steering mechanism for a motor vehicle comprising, in combination, a steering column, a cup shaped extension mounted on the upper end of said steering column and having bearing surfaces formed on an arc of a circle whose center is on the axis of said steering column, bearing blocks slideable upon said arcuate bearing surfaces, a planar bearing ring mounted upon said bearing blocks, means for clamping said bearing blocks and said planar bearing ring in various planes forming selected angles with the axis of said steering column, a steering post within said steering column, a steering wheel universally mounted on the upper end of said steering post, and a guide member carried by said steering wheel and slideably engageable upon said planar bearing ring to guide said steering wheel for rotation in a plane parallel to the plane of said bearing ring.

4. Steering mechanism for a motor vehicle comprising, in combination, a steering post, a steering wheel having a hub encircling said steering post and arranged concentrically therewith, a member encircling said steering post intermediate said steering post and said hub, a pair of diametrically aligned pivot pins interconnecting said steering post and said member, a pair of diametrically aligned pivot pins interconnecting said member and said hub, said pairs of pivot pins being arranged at right angles to each other, and means constraining rotation of said steering wheel about preselected axes angularly positioned with respect to the axis of said steering post.

5. Steering mechanism for a motor vehicle comprising, in combination, a steering column, an extension mounted upon the upper end of said steering column, a member mounted upon said extension in such manner as to be angularly adjustable with respect to the axis of said steering column, a steering post within said steering column, a steering wheel carried by said steering post and having a guide portion engageable with said member, and means for axially adjusting said steering column and said extension with respect to each other to position said guide portion and said member in engagement with each other.

6. Steering mechanism for attachment to a motor vehicle having a steering column and a steering shaft within said steering column, comprising a housing detachably mounted upon said steering column, an angularly adjustable member carried by said housing and having a planar bearing surface, a steering post detachably mounted upon the upper end of said steering shaft, a steering wheel having a portion engageable with the planar bearing surface of said member to guide said steering wheel for rotation in a plane parallel to said bearing surface, and universal joint mechanism interconnecting said steering wheel and said steering post.

7. In a motor vehicle, in combination, a steering post, a steering wheel, means mounting said steering wheel upon said steering post for universal movement about a point on the axis of said steering post, an electrical contact carried by said steering post, a second electrical contact carried by said steering wheel, said second electrical contact having a spherical portion adjacent said first-mentioned contact with the center of said spherical portion coinciding with the center of said universal movement between said steering wheel and said steering post.

CHARLES P. PINARDI.

REFERENCES CITED

The following references are of record in the file of this patent:

UNITED STATES PATENTS

| Number | Name | Date |
|---|---|---|
| 748,252 | Anderson | Dec. 29, 1903 |
| 851,680 | Love | Apr. 30, 1907 |
| 871,109 | Coates | Nov. 19, 1907 |
| 1,710,399 | Banning | Apr. 23, 1929 |
| 1,797,737 | Tenney | Mar. 24, 1931 |
| 1,870,525 | Nagamatsu | Aug. 9, 1932 |

FOREIGN PATENTS

| Number | Country | Date |
|---|---|---|
| 612,550 | France | Aug. 2, 1926 |
| 253,606 | Germany | Nov. 12, 1912 |